United States Patent [19]

Engler et al.

[11] Patent Number: 5,964,924
[45] Date of Patent: Oct. 12, 1999

[54] PROCESS AND INSTALLATION FOR THE SEPARATION OF A GAS MIXTURE BY ADSORPTION

[75] Inventors: Yves Engler, Vincennes; Christian Monereau, Paris, both of France

[73] Assignee: L'Air Liquide, Societe Anonyme Pour l'Etude et l'Exploitation des Procedes Georges Claude, Paris Cedex, France

[21] Appl. No.: 09/053,737

[22] Filed: Apr. 2, 1998

[30] Foreign Application Priority Data

Apr. 2, 1997 [FR] France .................................. 97 04004

[51] Int. Cl.⁶ ............................................... B01D 53/053
[52] U.S. Cl. ................................... 95/98; 95/100; 95/105
[58] Field of Search ........................ 95/96–98, 100–105; 96/130, 144

[56] References Cited

U.S. PATENT DOCUMENTS

| | | | |
|---|---|---|---|
| 3,142,547 | 7/1964 | Marsh et al. ............................. | 95/100 |
| 4,160,651 | 7/1979 | Pivard ..................................... | 95/97 |
| 4,461,630 | 7/1984 | Cassidy et al. ......................... | 95/100 |
| 4,468,237 | 8/1984 | Fuderer .................................... | 95/100 |
| 4,482,361 | 11/1984 | Whysall .................................. | 95/100 |
| 4,512,778 | 4/1985 | Simonet et al. ......................... | 95/100 |
| 4,512,779 | 4/1985 | Hay ........................................ | 95/100 |
| 4,781,735 | 11/1988 | Tagawa et al. .......................... | 95/101 |
| 4,816,039 | 3/1989 | Krishnamurthy et al. ................ | 95/97 |
| 4,963,339 | 10/1990 | Krishnamurthy et al. ............... | 95/98 X |
| 4,969,935 | 11/1990 | Hay ........................................ | 95/98 |
| 4,981,499 | 1/1991 | Hay et al. ................................ | 95/100 |
| 5,154,736 | 10/1992 | Mifflin .................................... | 95/100 |
| 5,246,676 | 9/1993 | Hay ........................................ | 95/98 X |
| 5,250,088 | 10/1993 | Yamaguchi et al. ..................... | 95/98 |
| 5,254,154 | 10/1993 | Gauthier et al. ........................ | 95/100 X |
| 5,258,059 | 11/1993 | Yamaguchi et al. ..................... | 95/100 |
| 5,518,526 | 5/1996 | Baksh et al. ............................. | 95/100 |
| 5,520,720 | 5/1996 | Lemcoff .................................. | 95/96 |
| 5,529,611 | 6/1996 | Monereau et al. ...................... | 95/101 |
| 5,565,018 | 10/1996 | Baksh et al. ............................. | 95/100 |
| 5,733,359 | 3/1998 | Doong et al. ........................... | 95/98 X |
| 5,846,294 | 12/1998 | Doong ..................................... | 95/98 |

FOREIGN PATENT DOCUMENTS

| | | |
|---|---|---|
| 0 273 723 | 7/1988 | European Pat. Off. . |
| 0 350 373 | 1/1990 | European Pat. Off. . |
| 0 500 416 | 8/1992 | European Pat. Off. . |
| 0 513 747 | 11/1992 | European Pat. Off. . |
| 0 689 862 | 1/1996 | European Pat. Off. . |
| 0 705 636 | 4/1996 | European Pat. Off. . |

*Primary Examiner*—Robert Spitzer
*Attorney, Agent, or Firm*—Young & Thompson

[57] ABSTRACT

This process comprises at least one stage of first decompression/first recompression by balancing the pressures between two adsorbers (2A to 2D) as well as the taking off of a constant product gas rate during the adsorption phase. In the course of the first decompression, the product gas taken off is passed to an auxiliary capacity (6) which is arranged in parallel to the product line (1) and can be connected to the product outlet side of each adsorber (2A to 2D). During the second recompression stage, the adsorber receives the product gas taken off in countercurrent and is at the same time put into communication with the auxiliary capacity. The process is useful in the production of hydrogen from a constant rate of a feed gas mixture.

10 Claims, 1 Drawing Sheet

5,964,924

PROCESS AND INSTALLATION FOR THE SEPARATION OF A GAS MIXTURE BY ADSORPTION

FIELD OF THE INVENTION

The present invention relates to a process for the separation of a gas mixture, in particular the production of hydrogen, by pressure swing adsorption (PSA) by means of an installation with n adsorbers, where n>1, of the type where the sequence of the following phases is carried out cyclically in each adsorber, the cycle being shifted by a time T/n from one adsorber to the next, where T designates the duration of the cycle:

(a) a substantially isobaric adsorption phase at the high cycle pressure, (b) a regeneration phase of the adsorbent, comprising at least one stage (b1) of a first decompression by balancing the pressures with another adsorber and then a stage (b3), (b4) of decompression down to the low cycle pressure, and (c) a pressure raising phase, comprising at least one recompression stage (c1) by balancing the pressures with another adsorber in the course of stage (b1), and a final recompression stage (c3) at the high cycle pressure by means of the product gas, a substantially constant product gas rate being taken off during phase (a) and being introduced into an adsorber in the course of phase (c) and/or into an auxiliary capacity involved in this phase (c).

BACKGROUND OF THE INVENTION

In the following text, the terms "inlet" and "outlet" designate the inlet and outlet ends of an adsorber in the adsorption phase; the expression "cocurrent" designates the direction of circulation of the gas in the adsorber during this adsorption phase, and the expression "countercurrent" designates the inverse direction of circulation.

In the PSA cycles applied to purification of hydrogen, the object of the pressure balancings is a reduction in the losses of the gas to be produced. Thus, in order to recover the hydrogen which is close to the outlet of the adsorber at the end of the adsorption phase, the regeneration phase includes at least one first cocurrent decompression stage by balancing the pressures with another adsorber which is undergoing a first countercurrent recompression stage. Considering, for simplification, the cycle with a single balancing step, in the course of the decompression stages which follow the first decompression by balancing, the gas extracted from the adsorber is generally used for eluting another adsorber at the low cycle pressure and is then extracted, as residual gas.

The gas still present in the adsorber at the balancing pressure can thus be considered as lost. In fact, the higher the pressure, the greater the volume of gas contained in an adsorber. Consequently, the lower the pressure of balancing, the lower the hydrogen losses, that is to say the higher the extraction yield.

A further constraint imposed on PSA installations is that they should deliver a substantially constant production rate. For this purpose, in the case where feeding the installation is carried out at constant rate (which is generally the case for hydrogen production installations), it has been proposed to take off a constant rate of product gas during the adsorbence phase and to feed this gas in countercurrent to the adsorber during the first recompression stage by balancing simultaneously with the first recompression gas. However, this method leads to a rise in the balancing pressure, and this reduces the yield as explained above.

It has also been proposed to introduce an auxiliary capacity into the production sequence with the purpose of substantially eliminating the variations in the production rate. However, this solution has the serious disadvantage of requiring an auxiliary capacity of very large dimensions if the desired pressure of use is only slightly lower than the pressure of the product gas at the outlets from the adsorbers.

SUMMARY OF THE INVENTION

It is the object of the invention to enable a substantially constant production rate and a very good yield to be obtained by using an auxiliary capacity of small volume.

For this purpose, the subject of the invention is a separation process of the abovementioned type, characterized in that:

during a first stage (a1) of phase (a), of the same duration as stage (b1), the product gas taken off is passed into the auxiliary capacity, and during a second stage (a2) of the phase, which follows stage (a1), the gas taken off is passed into an adsorber undergoing an intermediate recompression stage (c2), this adsorber being put simultaneously into communication with the auxiliary capacity, the feed rate of gas mixture to the installation is substantially constant.

The process according to the invention can comprise one or more of the following features:

during stage (a1), the auxiliary capacity is put into communication only with the adsorber which delivers the product gas thereto, and during stage (c2), pressure balancing is effected between the adsorber and the auxiliary capacity.

A further subject of the invention is an installation intended for implementing the process defined above.

This installation of the type comprising n adbsorbers, where n>1, a group of lines and switch-over and control elements and an auxiliary capacity which can be connected to a production line of the installation, is characterized in that the auxiliary capacity is arranged in parallel to the production line and can be connected to the product outlet side of each adsorber.

BRIEF DESCRIPTION OF THE DRAWINGS

An embodiment example of the invention will now be described with reference to the attached drawing in which.

DETAILED DESCRIPTION OF THE INVENTION

Figure 1:
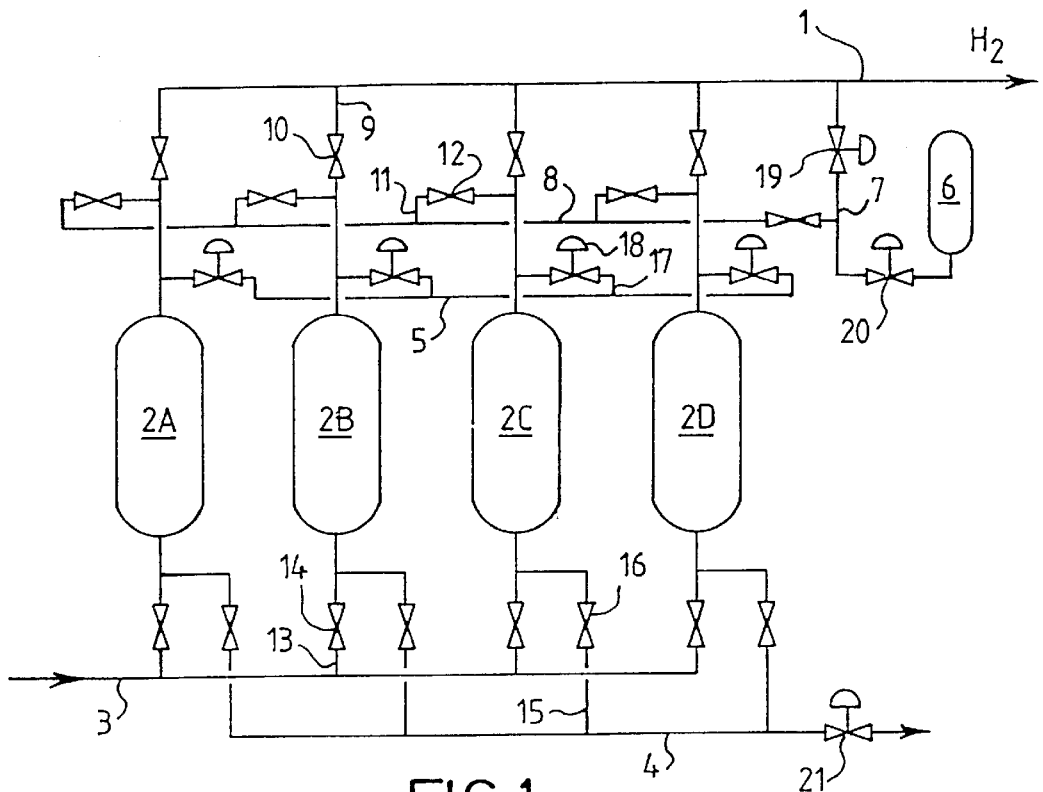
FIG. 1 diagrammatically shows an installation according to the invention.

The installation shown in FIG. 1 is intended to produce, in a production line 1, hydrogen at a substantially constant rate under a relatively high pressure, typically of the order of 25 to 30 bar. This production takes place by selective adsorption from a gas feed mixture by means of four adsorbers 2A to 2D. The feed gas is, for example, a steam-reformed synthesis gas which is introduced at constant rate through the feed line 3.

The installation also comprises an extraction line 4 for residual gas, a connecting line 5 between the adsorber outlets, and an auxiliary capacity 6 which is connected in parallel to the line 1 by means of a line 7. To the latter, a line 8 is attached which permits the capacity 6 to be connected to the adsorber outlets.

The line 1 is connected to the adsorber outlets by branches 9 which are each fitted with a stop valve 10. Likewise, the line 8 is connected to the adsorber outlets by branches 11 each fitted with a stop valve 12.

The line 3 is connected to the adsorber inlets by branches 13 each fitted with a stop valve 14. Likewise, the line 4 is connected to the adsorber inlets by branches 15 each fitted with a stop valve 16. The line 5 is connected to the adsorber outlets by branches 17 each fitted with a control valve 18. The line 7 contains two control valves 19 and 20 between which the line 8 is attached. The line 4 contains a control valve 21 downstream of its branches 15.

Figure 2:
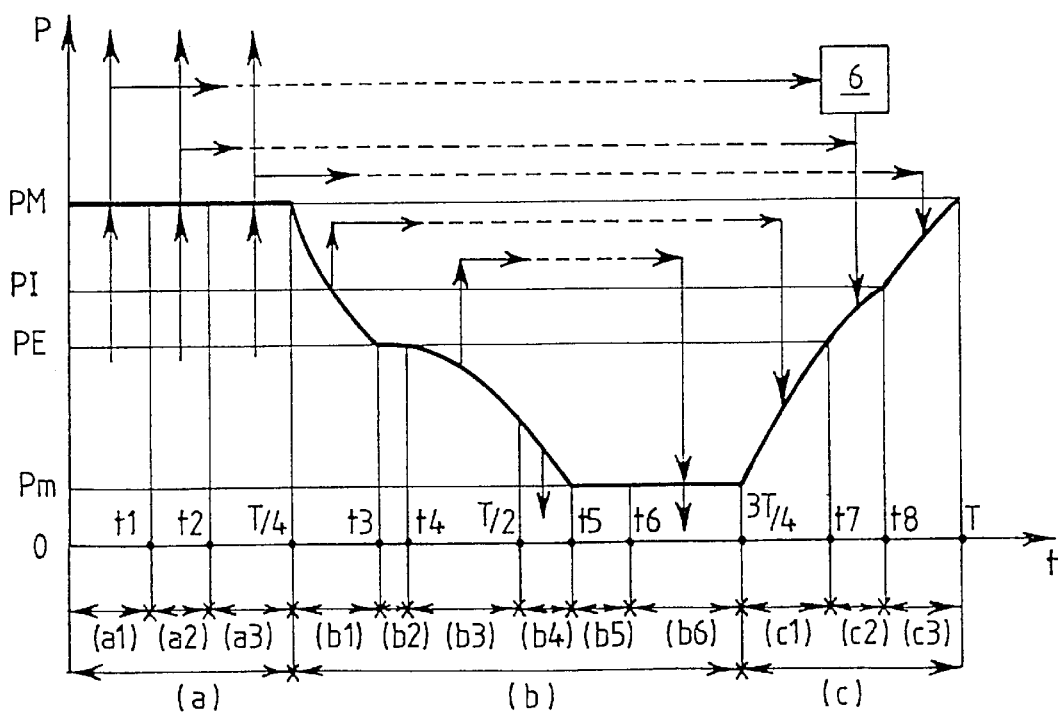
FIG. 2 is a diagram illustrating the operating cycle of this installation.

In addition, the installation comprises diverse operating and control means, which are well known in the art, suitable for operating the pressure swing adsorption (PSA) cycle illustrated in FIG. 2.

In this FIG. 2, where the times $t$ are plotted on the abscissa and the absolute pressures P are plotted on the ordinate, the lines marked by arrows indicate the movements and destinations of the gas streams. When the arrows are parallel to the ordinate axis, they indicate additionally the direction of circulation in an adsorber: when an arrow points in the direction of increasing ordinates (towards the top of the diagram), the direction of flow in the adsorber is cocurrent. If the arrow directed upwards is below the line indicating the pressure in the adsorber, the stream enters the adsorber through the inlet end thereof; if the arrow pointing upwards is above the line indicating the pressure, the stream leaves the adsorber through the outlet end thereof, the inlet and outlet ends being respectively those of the gas to be treated by the adsorber under consideration and of the gas taken off from this same adsorber during the adsorption phase. When an arrow points in the direction of decreasing ordinates (towards the bottom of the diagram), the direction of flow in the adsorber is countercurrent. If the arrow pointing downwards is below the line indicating the pressure in the adsorber, the stream leaves the adsorber through the inlet end thereof; if the arrow directed downwards is above the line indicating the pressure, the stream enters the adsorber through the outlet end thereof, the inlet and outlet ends always being those of the gas to be treated and of the gas taken off during the adsorption phase.

In the example being considered, the high cycle pressure PM is of the order of 27 bar, and the low cycle pressure Pm is close to 1.7 bar. The phase duration T/4 is 180 seconds.

It should be noted that, for clarity of the drawing, the proportions of the pressures are not to scale in FIG. 2.

The cycle will be described below for an adsorber, namely the adsorber 2A. The other adsorbers follow a cycle which is identical but shifted in time by T/4, T/2 and 3T/4 respectively.

The cycle consists of the following successive stages:

(a) Adsorption phase (almost isobaric):

(a1) From t=0 to t1, a first cocurrent adsorption stage in which the gas mixture to be treated is introduced via the line 3 to the inlet of the adsorber at approximately the pressure PM and circulates in cocurrent across this adsorber. The hydrogen produced is taken off at the outlet of the adsorber and passed into the product line 1. A predetermined rate D of hydrogen is taken off from the line 1 and passed into the capacity 6 via the line 7.

(a2) From t1 to t2, a second cocurrent adsorption phase which differs from the preceding one only by the fact that the rate D of hydrogen taken off at the adsorber outlet is passed in countercurrent to another adsorber which is in the second recompression stage (c2) described further below.

(a3) From t2 to T/4, a third cocurrent adsorption stage which differs from the preceding one only by the fact that the rate of hydrogen taken off at the adsorber outlet is passed in countercurrent to another adsorber which is at the stage of final recompression (c3) described further below.

(b) Adsorbent regeneration phase:

(b1) From T/4 to t3, with t3−T/4=t1, a first cocurrent decompression stage by balancing the pressures with another adsorber in the first countercurrent recompression phase (c1) described further below. In the course of this stage, the adsorber pressure falls from PM to an intermediate value PE, called the balancing pressure.

(b2) From t3 to t4, a dead period in which the adsorber is isolated. This optional stage may be necessary for compensating differences in the duration between certain stages of the cycle.

(b3) From t4 to T/2, a second cocurrent decompression stage in which the gas taken off from the adsorber outlet is passed in countercurrent into another adsorber in the elution phase (b6) described further below.

(b4) From T/2 to t5, a final countercurrent decompression stage down to the low cycle pressure Pm, in which the gas taken off from the adsorber inlet is extracted via, the line 4.

(b5) From t5 to t6, a dead period at low pressure, in which the adsorber is isolated. The remarks made above on the subject of stage (b2) are again applicable.

(b6) From t6 to 3T/4, with 3T/4−t6=T/2−t4, a countercurrent purge/elution stage at the low pressure Pm by means of gas coming from another adsorber in stage (b3). The gas coming out of the adsorber is extracted via the line 4.

(c) Recompression phase:

(c1) From 3T/4 to t7, with t7−3T/4=t3−T/4, a first countercurrent recompression stage by balancing the pressures with another adsorber in the course of stage (b1) of first cocurrent decompression. At the moment t7, the pressure is raised again to the intermediate value PE.

(c2) From t7 to t8, with t8−t7=t2−t1, an intermediate countercurrent recompression stage, in the course of which the adsorber, on the one hand, receives the rate D of product hydrogen from another adsorber in stage (a2) and, on the other hand, is put into communication with the capacity 6 via the line 8. This stage ends when the pressures of the adsorber and of the capacity are equal to the same intermediate pressure PI, so that PE<PI<PM.

The pressure PI is a function of the duration of the balancing between adsorbers, of the adsorption pressure PM and the balancing pressure PE, and of the duration of the emptying of the repressurization capacity 6 into the adsorber to be repressurized. This pressure PI is in practice of the order of a few bar.

(c3) From t8 To T, with T−t8=T/4−t2, a final countercurrent recompression stage by means of the rate D of hydrogen coming from another adsorber in stage (a3). At the instant T, the pressure has substantially returned to the value PM, and the cycle recommences.

Owing to the arrangement of the capacity 6 in parallel to the line 1 and to the manner, described above, of utilizing this capacity, the production rate is stable and the production pressure remains substantially equal to the pressure of the gas to be treated, minus pressure drops in the installation.

Moreover, the hydrogen yield remains high, because the low pressure Pm is kept at a minimum, and the volume of the capacity 6 is considerably smaller than it would be it this capacity were arranged in the line 1.

Of course, the invention is likewise applicable to cycles involving a number of adsorbers other than four and/or comprising more than one pressure balancing operation between adsorbers in the course of the decompression.

We claim:

1. A process for the separation of a gas mixture by pressure swing adsorption in an adsorption apparatus having n adsorbers, where n>1, including a cycle having the following steps for each adsorber;

(a) a substantially isobaric adsorption step at a high pressure of the cycle for producing a product gas stream (b) a regeneration step, comprising at least one sub-step (b1) of a first depressurization with pressure balance with another adsorber at a low pressure, and at least another sub-step (b3; b4) of depressurization down to a low pressure of the cycle; and (c) a pressure raising step, comprising at least one repressurization sub-step (c1) with pressure balance with another adsorber in said sub-step (b1), wherein a substantially constant product gas flow is derived from the product gas stream during said step (a) and is introduced into an adsorber in the course of said step (c) and/or into a auxiliary capacity used in said step (c), and wherein during a first sub-step (a1) of step (a), the derived product gas flow is passed into the auxiliary capacity, and during a subsequent second sub-step (a2) of step (a), the derived product gas flow is passed into an adsorber undergoing an intermediate repressurization step (c2), while said adsorber is simultaneously communicating with said auxiliary capacity.

2. The process of claim 1, wherein during sub-step (a1), the auxiliary capacity is put into communication only with the adsorber which delivers the product gas thereto.

3. The process of claim 1, wherein during sub-step (c2), pressure equalization occurs between the adsorber and the auxiliary capacity.

4. The process of claim 1, wherein the gas mixture is fed to the apparatus at a substantially constant flow rate.

5. The process of claim 1, wherein the pressure raising step (c) includes a final pressurization sub-step (c3) up to the high pressure of the cycle by product gas derived from the product gas stream.

6. The process of claim 1, wherein sub-step (a1) of step (a) is substantially of the same duration as sub-step (b1) of step (b).

7. The process of claim 1, wherein the low pressure of the cycle is not less than atmospheric pressure.

8. The process of claim 7, wherein the product gas is an hydrogen-rich gas mixture.

9. The process of claim 8, wherein the high pressure of the cycle is between $25 \times 10^5$Pa and $30 \times 10^5$Pa.

10. The process of claim 1, wherein the auxiliary capacity is arranged in parallel to a product gas delivering line and selectively connectable to a product outlet of each adsorber of the apparatus.

* * * * *